(12) United States Patent
Zhou et al.

(10) Patent No.: US 9,810,129 B2
(45) Date of Patent: Nov. 7, 2017

(54) INTEGRATED WASTE HEAT RECOVERY AND MOTOR ASSISTED TURBOCHARGER SYSTEM

(71) Applicant: TOYOTA MOTOR ENGINEERING & MANUFACTURING NORTH AMERICA, INC., Erlanger, KY (US)

(72) Inventors: Feng Zhou, South Lyon, MI (US); Ercan Mehmet Dede, Ann Arbor, MI (US); Shailesh N. Joshi, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 15/064,229

(22) Filed: Mar. 8, 2016

(65) Prior Publication Data

US 2017/0260889 A1    Sep. 14, 2017

(51) Int. Cl.
*F01N 5/02* (2006.01)
*F02B 33/40* (2006.01)
*F02B 37/10* (2006.01)
*F02B 37/18* (2006.01)
*F02B 39/10* (2006.01)
*F22B 1/18* (2006.01)

(52) U.S. Cl.
CPC ............... *F01N 5/02* (2013.01); *F02B 33/40* (2013.01); *F02B 37/10* (2013.01); *F02B 37/183* (2013.01); *F02B 39/10* (2013.01); *F22B 1/1807* (2013.01)

(58) Field of Classification Search
CPC .......... F01N 5/02; F02B 33/40; F02B 37/183; F02B 37/10; F02B 39/10

USPC .................................................. 60/602, 605.2
See application file for complete search history.

(56) References Cited

U.S. PATENT DOCUMENTS

| 9,021,808 | B2 | 5/2015 | Nelson et al. | |
| 2005/0266293 | A1* | 12/2005 | Delzanno | F01D 15/02 429/415 |
| 2006/0032225 | A1* | 2/2006 | Dyne | F02B 37/10 60/607 |
| 2013/0174544 | A1 | 7/2013 | Valetutti | |
| 2014/0123642 | A1 | 5/2014 | Kim | |
| 2014/0311141 | A1 | 10/2014 | Mori et al. | |

(Continued)

FOREIGN PATENT DOCUMENTS

GB    1534668    12/1978

*Primary Examiner* — Mark Laurenzi
*Assistant Examiner* — Dapinder Singh
(74) *Attorney, Agent, or Firm* — Oblon, McClelland, Maier & Neustadt, L.L.P.

(57) ABSTRACT

A system for recovering waste heat energy for a motor assisted turbocharger, including a turbine, a first power transmission device connected on a first side to the turbine, a drive gear disposed about and connected on a first side to a second side of the first power transmission device, a second power transmission device connected on a first side to a second side of the drive gear, and a compressor connected to a second side of the second power transmission device. The system further includes a motor gear drivingly connected to the drive gear, a motor generator connected to the motor gear, a waste heat recovery circuit including an expander, an output gear connected to the expander and drivingly connected to the motor gear.

20 Claims, 7 Drawing Sheets

(56) References Cited

U.S. PATENT DOCUMENTS

2015/0275698 A1 10/2015 Kawai
2015/0308318 A1 10/2015 Gibble

* cited by examiner

INTEGRATED WASTE HEAT RECOVERY AND MOTOR ASSISTED TURBOCHARGER SYSTEM

BACKGROUND

Description of the Related Art

There is a continued need for performance and efficiency improvements in the use of turbochargers in motor vehicles. Fuel efficiency and emissions continue to be high priority issues for vehicle manufacturers and owners alike. Thus practical improvements to maximize turbocharging system efficiency and performance continue to be sought after. Further, turbo lag, throttle response, and drivability remain vital aspects for marketplace acceptance in day-to-day use of the technology.

SUMMARY

The present disclosure is directed to a system for recovering waste heat energy for a motor assisted turbocharger, including a turbine, a first power transmission device connected on a first side to the turbine, a drive gear disposed about and connected on a first side to a second side of the first power transmission device, a second power transmission device connected on a first side to a second side of the drive gear, and a compressor connected to a second side of the second power transmission device.

The system further includes a motor gear drivingly connected to the drive gear, a motor generator connected to the motor gear, a waste heat recovery circuit including an expander, an output gear connected to the expander and drivingly connected to the motor gear.

In a case where the first power transmission device is engaged, engine exhaust gas drives the turbine, and the turbine drives the compressor, the motor generator, or both.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein.

DETAILED DESCRIPTION OF THE EMBODIMENTS

In the drawings, like reference numerals designate identical or corresponding parts throughout the several views. Further, as used herein, the words "a", "an" and the like generally carry a meaning of "one or more", unless stated otherwise.

Referring now to the drawings, wherein like reference numerals designate identical or corresponding parts throughout the several views.

Figure 1:
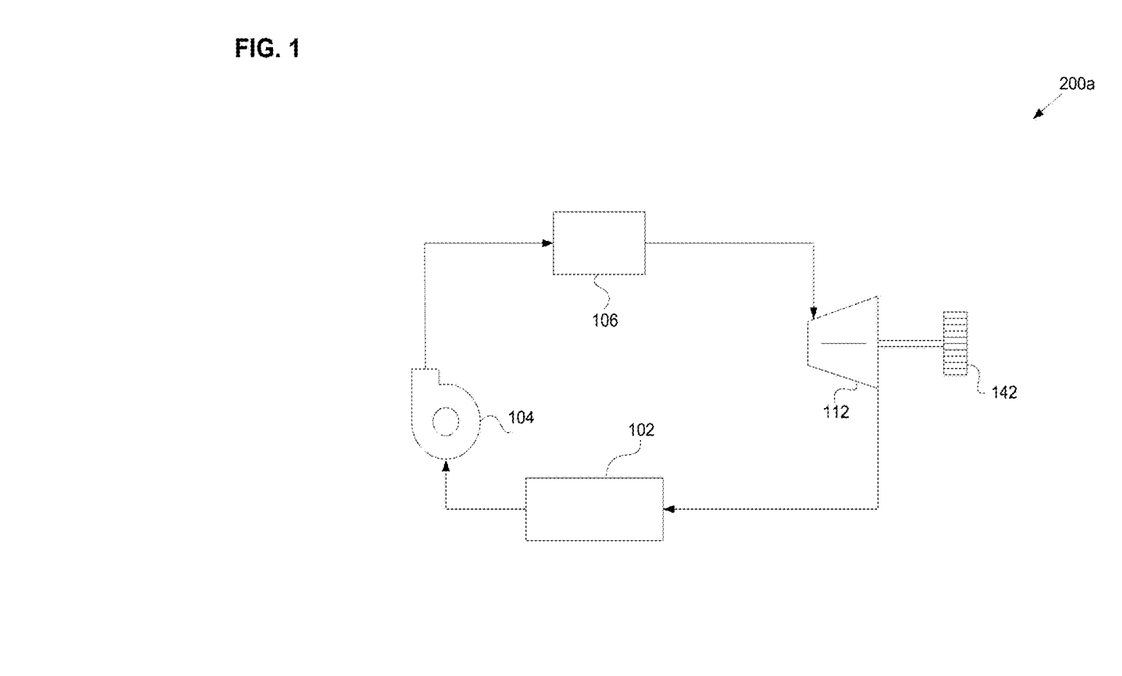
FIG. 1 is a diagram of a waste heat recovery circuit, according to one example.

FIG. 1 is a diagram of a waste heat recovery circuit 200a, according to one example. The waste heat recovery circuit 200a includes a condenser 102, a pump 104, a power electronics cold plate 106, and an expander 112.

While the example described by FIG. 1 uses the power electronics cold plate 106 as a source of waste heat, one having ordinary skill in the art will understand that a variety of sources of waste heat, for example heat exchangers, turbocharger intercoolers, boilers, engine blocks, expanders, turbines, and recuperators arranged in a variety of combinations and configurations, could be applicable to the waste heat recovery circuits described herein.

The power electronics cold plate 106 is connected downstream of the pump 104, and the expander 112 is connected downstream of the power electronics cold plate 106. The condenser 102 is connected upstream of the pump 104 and downstream of the expander 112. The 200a contains a working fluid 202 that is circulated through the power electronics cold plate 106 by the pump 104, where heat energy is transferred from the power electronics cold plate 106 to the working fluid 202, where the working fluid 202 may change from liquid to vapor form. The working fluid 202 is then circulated through the expander 112, providing thermal energy input for the expander 112 to convert into mechanical work output, for example in the form of rotating an output gear 142. The working fluid 202 is routed from the exit of the expander 112 into the condenser 102, where the working fluid 202 may be condensed from vapor form into liquid form by the transfer of heat from the working fluid 202 to the atmosphere, and then the working fluid 202 is directed back into the pump 104 to repeat the cycle described.

In one example, the power electronics cold plate 106 is designed to cool power electronics, particularly those of vehicles with hybrid powertrains or electric vehicles, such as systems related to AC to DC conversion, or conversion of DC battery power to 3 phase AC power. The power electronics cold plate 106 is presently designed for operating temperatures in the range of approximately 40 to 150 degrees Celsius, with the power electronics reaching as high as about 200 degrees Celsius. Future designs of the power electronics may operate at even higher temperature ranges, presenting greater cooling demands of the power electronics cold plate 106. In this example, the power electronics cold plate 106 is the sole heat source of the waste heat recovery circuit 200a.

The working fluid 202 may be a refrigerant composed of a range of substances, for example only water, a mixture of 50 percent water and 50 percent glycol, a coolant comprising a mixture of water and glycol of various proportions, R-245fa, or any number of organic or inorganic refrigerants.

Further, the waste heat recovery circuits 200a through 200e described herein may, for example, comprise a Rankine cycle type of system.

Figure 2:
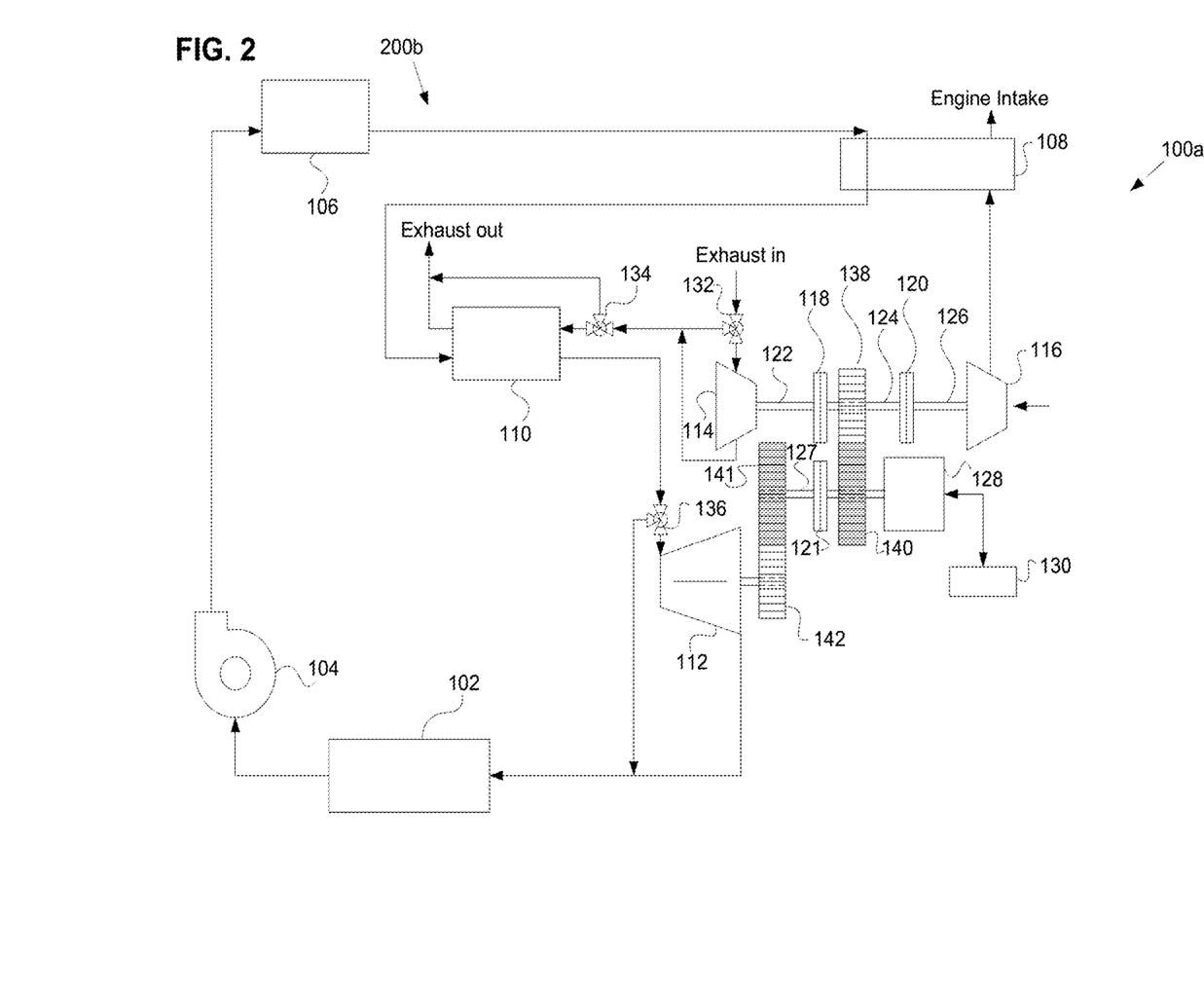
FIG. 2 is a diagram of a motor assisted turbocharger system connected to a waste heat recovery circuit, according to one example.

FIG. 2 is a diagram of a motor assisted turbocharger system 100a connected to a waste heat recovery circuit 200b, according to one example. The motor assisted turbocharger system 100a comprises a turbine 114, a first shaft 122 connected at a first end to the turbine 114, and a first power transmission device 118. The first power transmission device 118 is connected on a first side to a second end of the first shaft 122. A second shaft 124 is connected at a first end to a second side of the first power transmission device 118 and a drive gear 138 is disposed about and rigidly connected to the second shaft 124. A second power transmission device 120 is connected on a first side to a second end of the second shaft 124. A third shaft 126 is connected at a first end to a second side of the second power transmission device 120, and a compressor 116 connected to a second end of the third shaft 126. A motor gear 140 is drivingly connected to the drive gear 138, and a motor generator 128 is connected to the motor gear 140. The output gear 142 is connected to the expander 112 of the waste heat recovery circuit 200b, and drivingly connected to an intermediate gear 141. The intermediate gear 141 is connected to a first side of a third power transmission device 121. A second side of the third power transmission device is connected to the motor gear 140. Further, the intermediate gear 141 may be connected to the first side of the third power transmission device 121 by a fourth shaft 127.

The waste heat recovery circuit 200b is similar to the waste heat recovery circuit 200a illustrated in FIG. 1 with the exception that the waste heat recovery circuit 200b further comprises a turbocharger intercooler 108 connected downstream of the power electronics cold plate 106, a boiler 110 connected downstream of the turbocharger intercooler 108, and an expander bypass valve 136 connected downstream of the boiler 110. The turbocharger intercooler 108, the boiler 110, and the expander bypass valve 136 are disposed between the power electronics cold plate 106 and the expander 112. The turbocharger intercooler 108 cools compressed air moving from the compressor 116 toward an intake of an engine 146 by transferring heat from the compressed air to the waste heat recovery circuit 200b by heating the working fluid 202 as it circulates through the turbocharger intercooler 108.

An advantage of a two-phase liquid to vapor cooling system compared to a single-phase gas-to-gas (.e.g. air cooled intercooler) or liquid-to-gas (e.g. single-phase liquid-cooled intercooler) cooling system, even if operating temperature ranges are similar, is that more thermal energy may be transferred because of the additional latent energy present during phase changes of the working fluid 202. A two-phase system thus allows for the use of a smaller turbocharger intercooler 108 than is the case with a single-phase system.

The expander bypass valve 136 is disposed upstream of and connected to an inlet of the expander 112. The expander bypass valve 136 is further connected to an inlet of the condenser 102. In a case where the expander bypass valve 136 is closed, the working fluid 202 is directed into the expander 112 to drive the expander 112 and the output gear 142. In a case where the expander bypass valve 136 is open, the working fluid 202 is directed into the inlet of the condenser 102, bypassing the expander 112.

A turbine bypass valve 132 is disposed upstream of and connected to an inlet of the turbine 114. The turbine bypass valve 132 is further connected to a boiler bypass valve 134, the boiler bypass valve 134 disposed upstream of and connected to an inlet of the boiler 110. In a case where the turbine bypass valve 132 is closed, engine exhaust is directed into the turbine 114 to drive the turbine 114, and then to the boiler bypass valve 134 such that exhaust gas from the turbine 114 may further heat the working fluid 202 prior to the working fluid 202 entering the expander 112. In a case where the turbine bypass valve 132 is open, engine exhaust is directed to the boiler bypass valve 134 without entering the turbine 114. If the boiler bypass valve 134 is closed, engine exhaust is directed through the boiler 110, further heating the working fluid 202 circulating through the boiler 110 prior to the expander bypass valve 136. If the boiler bypass valve 134 is open, engine exhaust is directed around the boiler 110.

Engine exhaust gas and the working fluid 202 are thermally coupled within the boiler 110, allowing heat to be transferred between exhaust gas and the working fluid 202. The boiler 110 heats the working fluid 202 as exhaust gas flows through a portion of the boiler 110 by transferring heat from the exhaust gas to the working fluid 202 as the working fluid 202 flows through another portion of the boiler 110.

An energy storage device 130 is electrically connected to the motor generator 128 to provide electrical energy to the motor generator 128 in a case where the motor generator 128 is operating as a motor and, in a case where the motor generator 128 is operating as a generator, the energy storage device 130 stores electrical energy produced by the motor generator 128. The energy storage device 130 may include a vehicle battery, spark plugs, a motor that provides motive force to the vehicle, or a standalone battery electrically coupled to the motor assisted turbocharger system 100a. The motor assisted turbocharger system 100a and the waste heat recovery circuit 200b are designed to harvest and store energy that would otherwise be lost during operation of a powertrain.

In a case where the turbine 114 is driven by engine exhaust gas and the first power transmission device 118 is engaged, the turbine 114 drives at least one of the set consisting of the compressor 116 and the motor generator 128. If the second power transmission device 120 is disengaged, the compressor 116 is not powered. If the second power transmission device 120 is engaged, the compressor 116 is powered. The motor generator 128 may also be driven by the turbine 114, to operate in a generating mode to charge the energy storage device 130, independent of the engagement of the second power transmission device 120, provided the first power transmission device 118 is engaged. Further, use of the turbine 114 to power the motor generator 128 in a generating mode is independent of use of the expander 112 if the third power transmission device 121 is disengaged.

In a case where the expander 112 is driven by the working fluid 202, the expander 112 may drive the motor generator 128 to operate in a generating mode to charge the energy storage device 130. Further, the motor generator 128 may be concurrently driven by the expander 112 and the turbine 114, to operate in a generating mode to charge the energy storage device 130, if the first power transmission device 118 is engaged, and the third power transmission device 121 is engaged.

In another case, the motor generator 128 operates as a motor powered by the energy storage device 130, the second power transmission device 120 is engaged, and the compressor 116 is driven by the motor generator 128. The compressor 116 may be concurrently driven by both the motor generator 128 and the expander 112 if the third power transmission device 121 is engaged. Further, if the turbine 114 is powered, the expander 112 is powered, the first power transmission device 118 is engaged, and the third power transmission device 121 is engaged then the compressor 116 may be concurrently driven by at least one of the motor generator 128, the expander 112, and the turbine 114.

In a case where the turbine 114 is not powered, for example if the turbine bypass valve 132 is open, then neither the motor generator 128 nor the compressor 116 are powered by the turbine 114.

In a case where the expander 112 is not powered, for example if the expander bypass valve 136 is open, then neither the motor generator 128 nor the compressor 116 are powered by the expander 112.

In a case where the expander 112 and the turbine 114 are not powered, then the compressor 116 cannot be powered unless the second power transmission device 120 is engaged and the motor generator 128 is operating in a motor mode.

In a case where the first power transmission device 118 and the second power transmission device 120 are engaged, and the compressor 116 is driven by the turbine 114, the motor generator 128 may operate in a motor generating mode and be powered by the expander 112, provided the drive gear 138 is able to freewheel about the second shaft 124.

One case where exhaust gas bypass of the turbine bypass valve 132 and the boiler bypass valve 134 may be useful is when exhaust heat is needed elsewhere, for example to increase temperature of a catalytic converter (not shown). Further, during such an operating mode the waste heat recovery circuit 200b may be entirely bypassed, for example by not operating the pump 104, so that heat in the working fluid 202 is directed where needed, with less of it rejected to the atmosphere.

Another example of a case where the compressor 116 may not be needed and can be disengaged is that of steady state engine operation at a low engine load, providing lower engine exhaust back pressure. This is beneficial since a reduction in backpressure can reduce fuel consumption and improve engine efficiency. The heat of the working fluid 202 may then be used to drive at least one of the expander 112 and the turbine 114 to drive the motor generator 128 in a generator mode to charge the energy storage device 130.

Another example of a case where the turbine bypass valve 132 may be bypassed is when engine exhaust gas temperature is below a predetermined temperature, such as after startup of the engine 146, before the engine 146 is up to an operating temperature.

The first power transmission device 118 may be a clutch or a planetary gear system, allowing for control of the transmission of rotational power between the turbine 114 and the drive gear 138.

The second power transmission device 120 may be a clutch or a planetary gear system, allowing for control of the transmission of rotational power between the drive gear 138 and the compressor 116.

The third power transmission device 121 may be a clutch or a planetary gear system, allowing for control of the transmission of rotational power between the intermediate gear 141 and the motor gear 140.

Presently, the turbine 114 may operate at rotational speeds exceeding about 150,000 RPM, while the expander 112 may generally operate at up to about 100,000 RPM, and the motor generator 128 may generally operate in the range of approximately 50,000 to 80,000 RPM. However, the trend for the development of all these components is toward higher speeds and more compact dimensions.

In another example, the turbine 114 may be directly connected to the first power transmission device 118, the first power transmission device 118 may be directly connected to the drive gear 138, the drive gear 138 may be directly connected to the second power transmission device 120, and the second power transmission device 120 may be directly connected to the compressor 116. In such a case, the first shaft 122, the second shaft 124, and the third shaft 126 may be omitted.

In this example, the power electronics cold plate 106, the turbocharger intercooler 108, and the boiler 110 may each serve as a heat source for the waste heat recovery circuit 200b.

Figure 3:
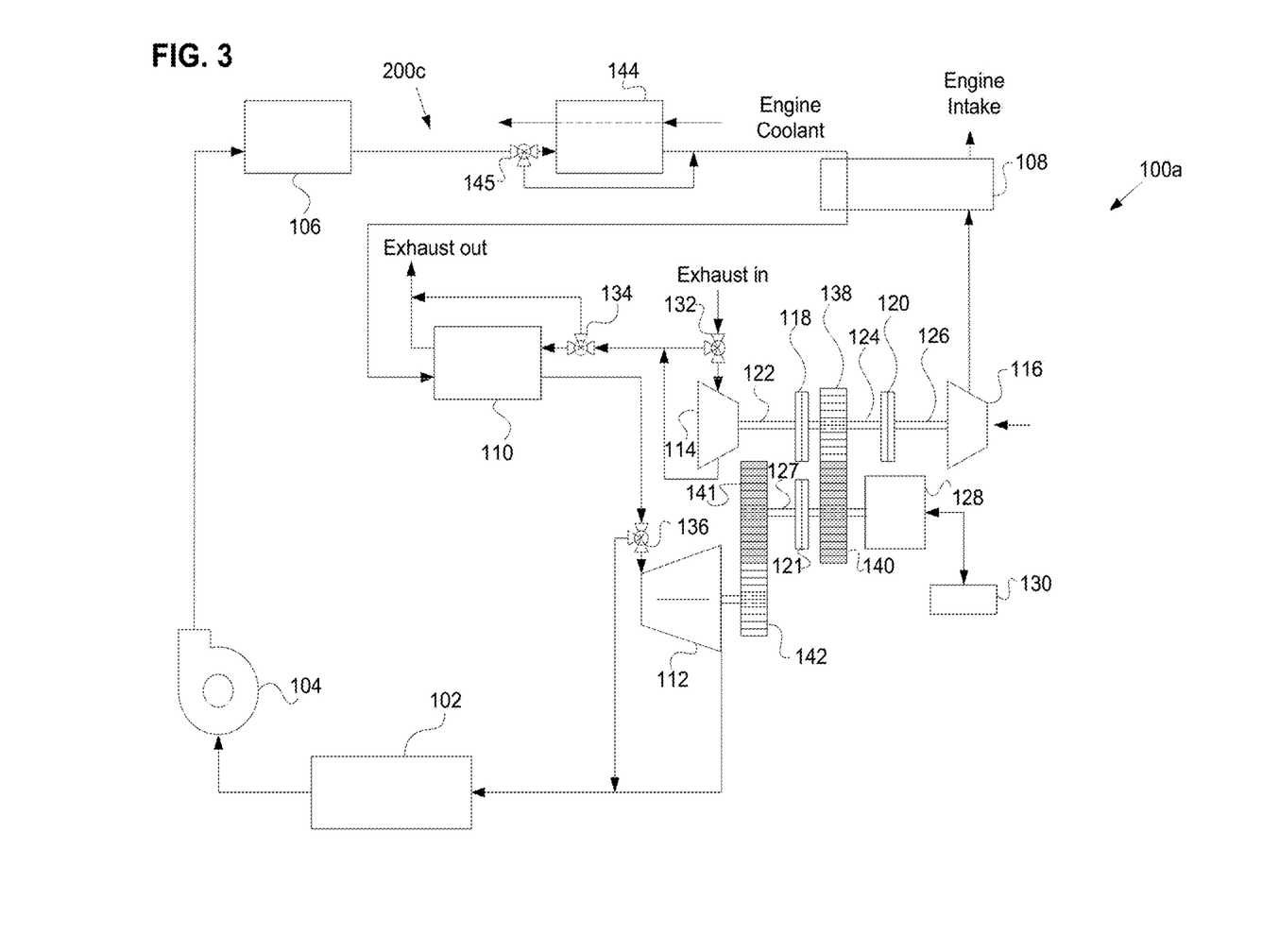
FIG. 3 is a diagram of a motor assisted turbocharger system connected to a waste heat recovery circuit, including a heat exchanger, according to one example.

FIG. 3 is a diagram of a motor assisted turbocharger system 100a connected to a waste heat recovery circuit 200c, including a heat exchanger 144, according to one example. The waste heat recovery circuit 200c is similar to the waste heat recovery circuit 200b described by FIG. 2, with the addition of the heat exchanger 144 and a coolant bypass valve 145. The heat exchanger 144 may be disposed between the power electronics cold plate 106 and the turbocharger intercooler 108, downstream of the power electronics cold plate 106 and upstream of the turbocharger intercooler 108. A coolant bypass valve 145 may be disposed upstream of and connected to an inlet of the heat exchanger 144. Engine coolant and the working fluid 202 are thermally coupled within the heat exchanger 144, allowing heat to be transferred between the engine coolant and the working fluid 202. In a case where the coolant bypass valve 145 is closed, the heat exchanger 144 heats the working fluid 202 as engine coolant flows through a portion of the heat exchanger 144 by transferring heat from the engine coolant to the working fluid 202 as the working fluid 202 flows through another portion of the heat exchanger 144. In a case where the coolant bypass valve 145 is open, the working fluid 202 is routed around the heat exchanger 144 and toward the turbocharger intercooler 108, and heat is not transferred between the heat exchanger 144 and the working fluid 202.

Exhaust gas bypass of the turbine bypass valve 132 and the boiler bypass valve 134 may be useful when exhaust heat is needed elsewhere, for example to increase temperature of engine coolant flowing through the heat exchanger 144 after cold start while the engine coolant is warming up to a predetermined minimum temperature. Further, during such an operating mode the waste heat recovery circuit 200c may be entirely bypassed, for example by not operating the pump 104, so that heat in the working fluid 202 is directed elsewhere in the system, with less of the heat rejected to atmosphere.

In this example, the power electronics cold plate 106, the heat exchanger 144, the turbocharger intercooler 108, and the boiler 110 may each serve as a heat source for the waste heat recovery circuit 200c.

Figure 4:
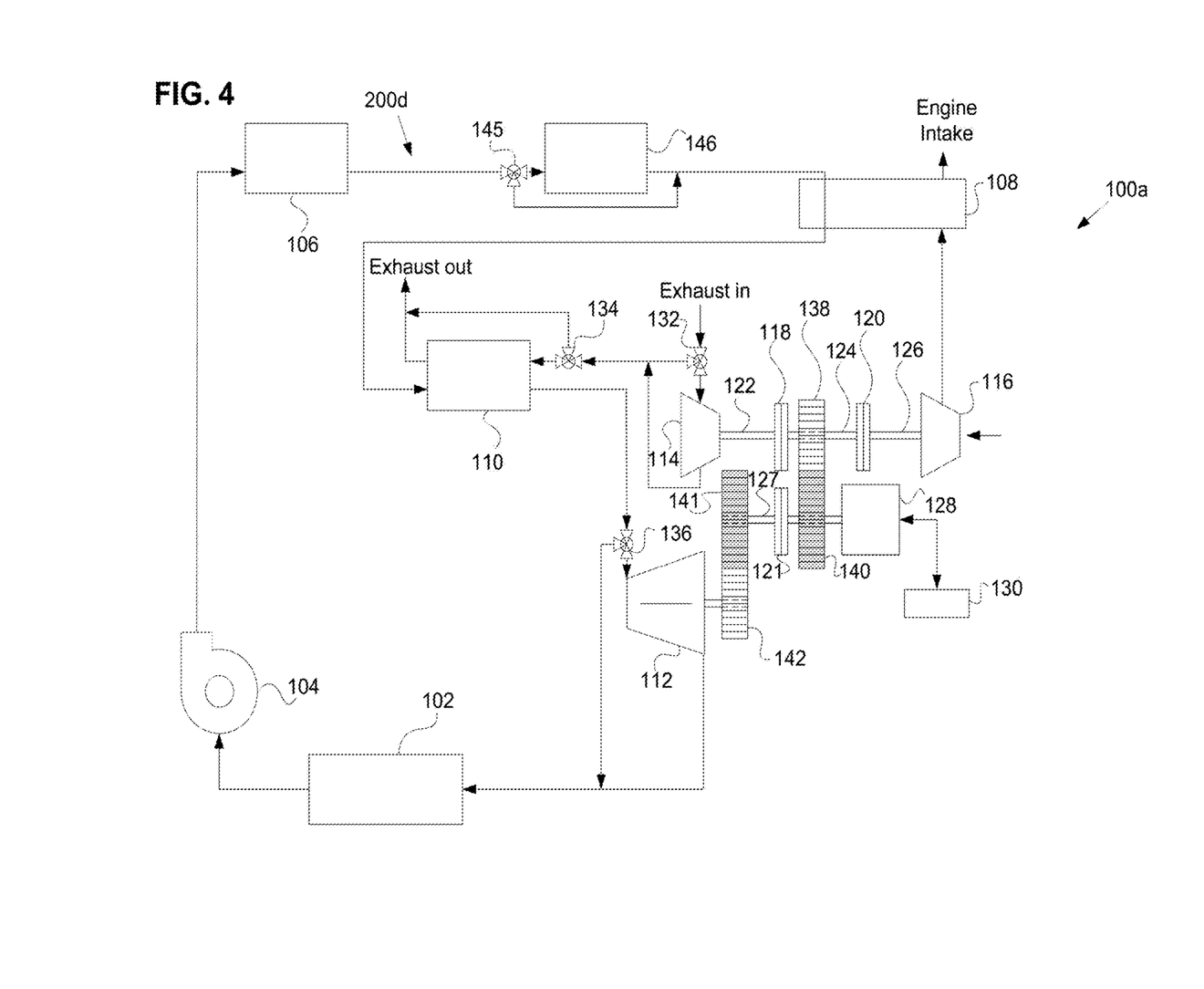
FIG. 4 is a diagram of a motor assisted turbocharger system connected to a waste heat recovery circuit, including an engine, according to one example.

FIG. 4 is a diagram of a motor assisted turbocharger system 100a connected to a waste heat recovery circuit 200d, including an engine 146, according to one example. The waste heat recovery circuit 200d is similar to the waste heat recovery circuit 200b described by FIG. 2, with the addition of the engine 146 and the coolant bypass valve 145. The engine 146 may be disposed between the power electronics cold plate 106 and the turbocharger intercooler 108, downstream of the power electronics cold plate 106 and upstream of the turbocharger intercooler 108. The coolant bypass valve 145 may be disposed upstream of and connected to an inlet of the engine 146. In a case where the coolant bypass valve 145 is closed, as the working fluid 202 within the waste heat recovery circuit 200d flows through or by a portion of the engine 146, the engine 146 transfers heat to the working fluid 202. In a case where the coolant bypass valve 145 is open, the working fluid 202 is routed around the engine 146 and toward the turbocharger intercooler 108, and heat is not transferred between the engine 146 and the working fluid 202.

Exhaust gas bypass of the turbine bypass valve 132 and the boiler bypass valve 134 may be useful when exhaust heat is needed elsewhere, for example to increase temperature of engine coolant flowing through the engine 146 after cold start while the engine 146 is warming up until the engine coolant exceeds a predetermined temperature. Further, during such an operating mode the waste heat recovery circuit 200d may be entirely bypassed, for example by not operating the pump 104, so that heat in the working fluid 202 is directed elsewhere in the system, with less of the heat rejected to atmosphere.

In this example, the power electronics cold plate 106, the engine 146, the turbocharger intercooler 108, and the boiler 110 may each serve as a heat source for the waste heat recovery circuit 200d.

Figure 5:
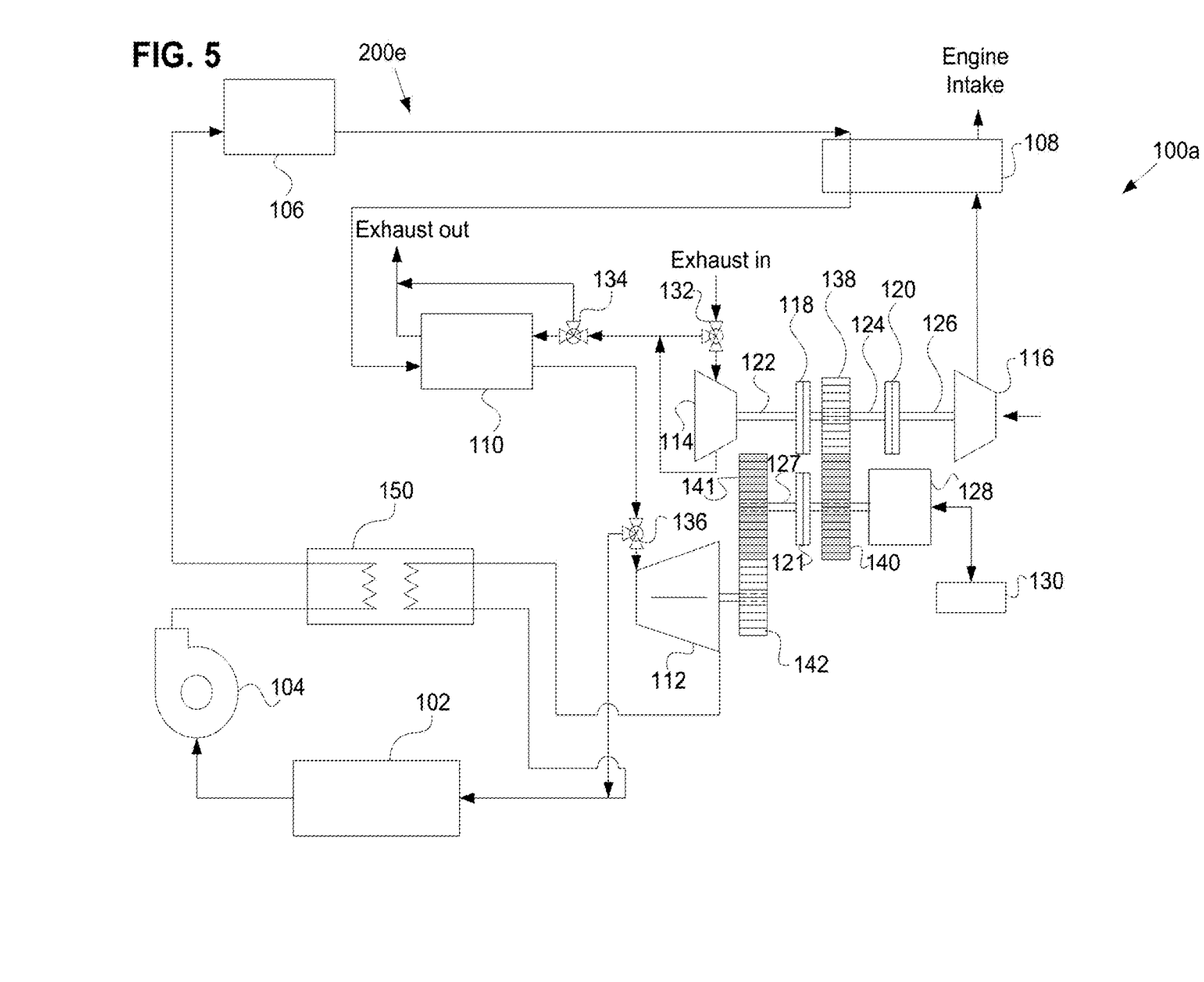
FIG. 5 is a diagram of a motor assisted turbocharger system connected to a waste heat recovery circuit, including a recuperator, according to one example.

FIG. 5 is a diagram of a motor assisted turbocharger system 100a connected to a waste heat recovery circuit 200e, including a recuperator 150, according to one example. The waste heat recovery circuit 200e is similar to the waste heat recovery circuit 200b described by FIG. 2, with the addition of the recuperator 150. A hot side of the recuperator 150 may be disposed between the expander 112 and the condenser 102, while a cool side of the recuperator 150 may be disposed between the pump 104 and the power electronics cold plate 106. Heat is transferred from the hot side of the recuperator 150 at the exit of the expander 112, where a portion of the working fluid 202 may be in vapor or vapor-liquid form, directly to a portion of the working fluid 202 exiting the cool side of the recuperator 150 disposed downstream of the pump 104, where the portion of the working fluid 202 is at a cooler temperature because that portion of the working fluid 202 has been through the condenser 102, dissipated some heat to atmosphere, and condensed to liquid form. With the recuperator 150, some of the residual heat energy of the working fluid 202 that would normally be dissipated to atmosphere by the condenser 102 is transferred to a portion of the working fluid 202 after the pump 104, increasing system efficiency and reducing the cooling work the condenser 102 must perform by lowering the temperature of the working fluid 202 at the inlet of the condenser 102. The waste heat recovery circuit 200e equipped with the recuperator 150 refrigerant generally uses an organic working fluid 202.

In this example, the power electronics cold plate 106, the recuperator 150, the turbocharger intercooler 108, and the boiler 110 may each serve as a heat source for the waste heat recovery circuit 200e.

Figure 6:
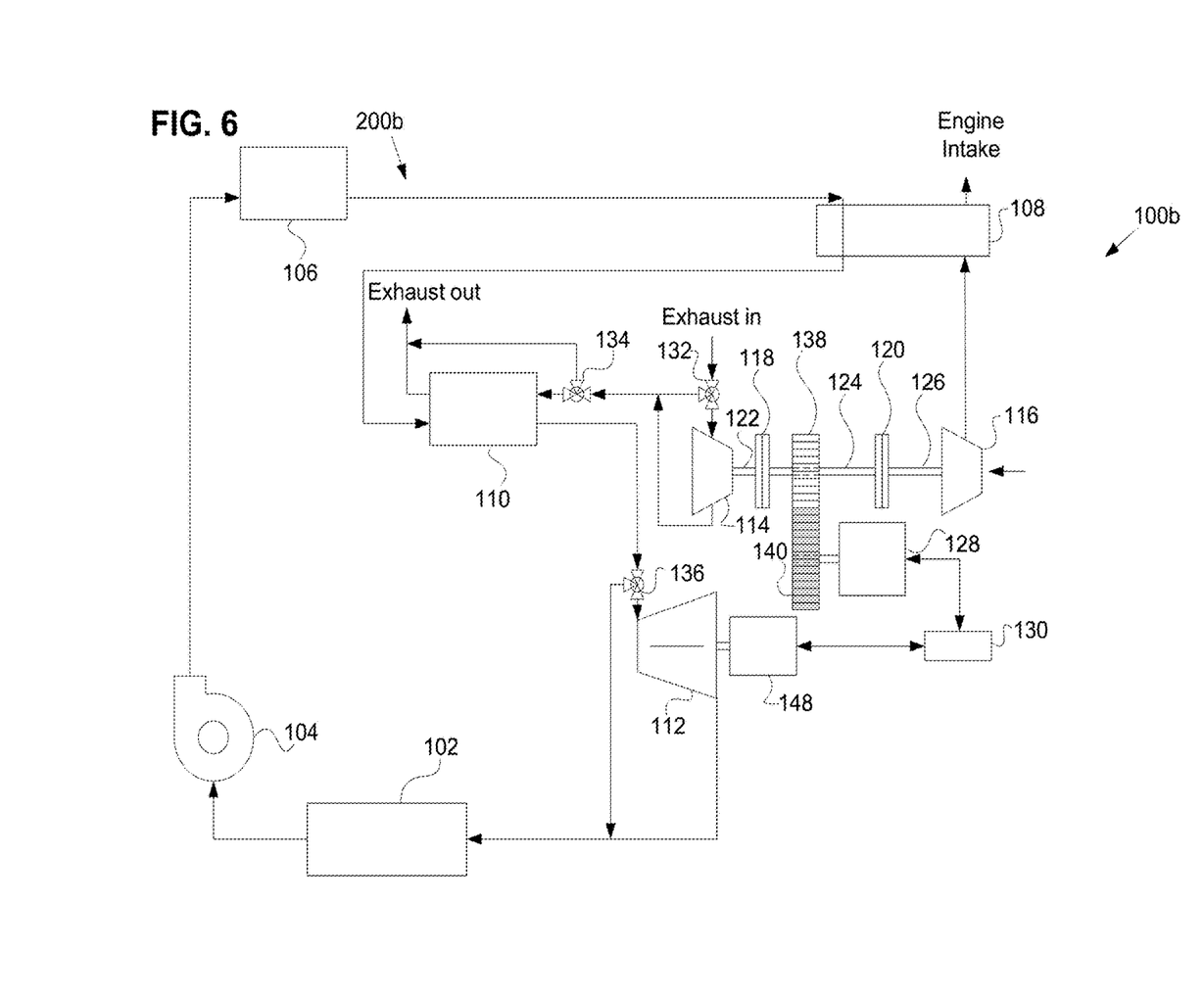
FIG. 6 is a diagram of a motor assisted turbocharger system, including a generator, and the waste heat recovery circuit, according to one example.

FIG. 6 is a diagram of a motor assisted turbocharger system 100b, including a generator 148, and the waste heat recovery circuit 200b, according to one example. The waste heat recovery circuit 200b is the same as described by FIG. 2. The motor assisted turbocharger system 100b is similar to the motor assisted turbocharger system 100a described by FIG. 2 through FIG. 5, with the addition of the generator 148 in place of the output gear 142. The generator 148 is connected to the expander 112 and electrically connected to the energy storage device 130. In this example, the expander 112 may drive the generator 148 to charge the energy storage device 130 separately from the operation of the motor generator 128 and that of the turbine 114.

The addition of the generator 148 decouples the motor and generating modes of the motor generator 128 and the generator 148, allowing the motor assisted turbocharger system 100b the flexibility to drive the compressor 116 and concurrently charge the energy storage device 130.

In one case, the expander 112 may drive the generator 148 to charge the energy storage device 130 while the motor generator 128 operates in a motor mode to operate the compressor 116.

In another case, the expander 112 may drive the generator 148 to charge the energy storage device 130, while the turbine 114 drives the motor generator 128 to operate in a generator mode and concurrently charge the energy storage device 130.

In another case, the expander 112 may drive the generator 148 to charge the energy storage device 130, while the turbine 114 and the motor generator 128 both drive the compressor 116.

In this example, the power electronics cold plate 106, the turbocharger intercooler 108, and the boiler 110 may each serve as a heat source for the waste heat recovery circuit 200b. Other components, such as the heat exchanger 144 and the coolant bypass valve 145 from FIG. 3, the engine 146 and the coolant bypass valve 145 from FIG. 4, and the recuperator 150 from FIG. 5 may also be present in the waste heat recovery circuit 200b described by FIG. 6.

Figure 7:
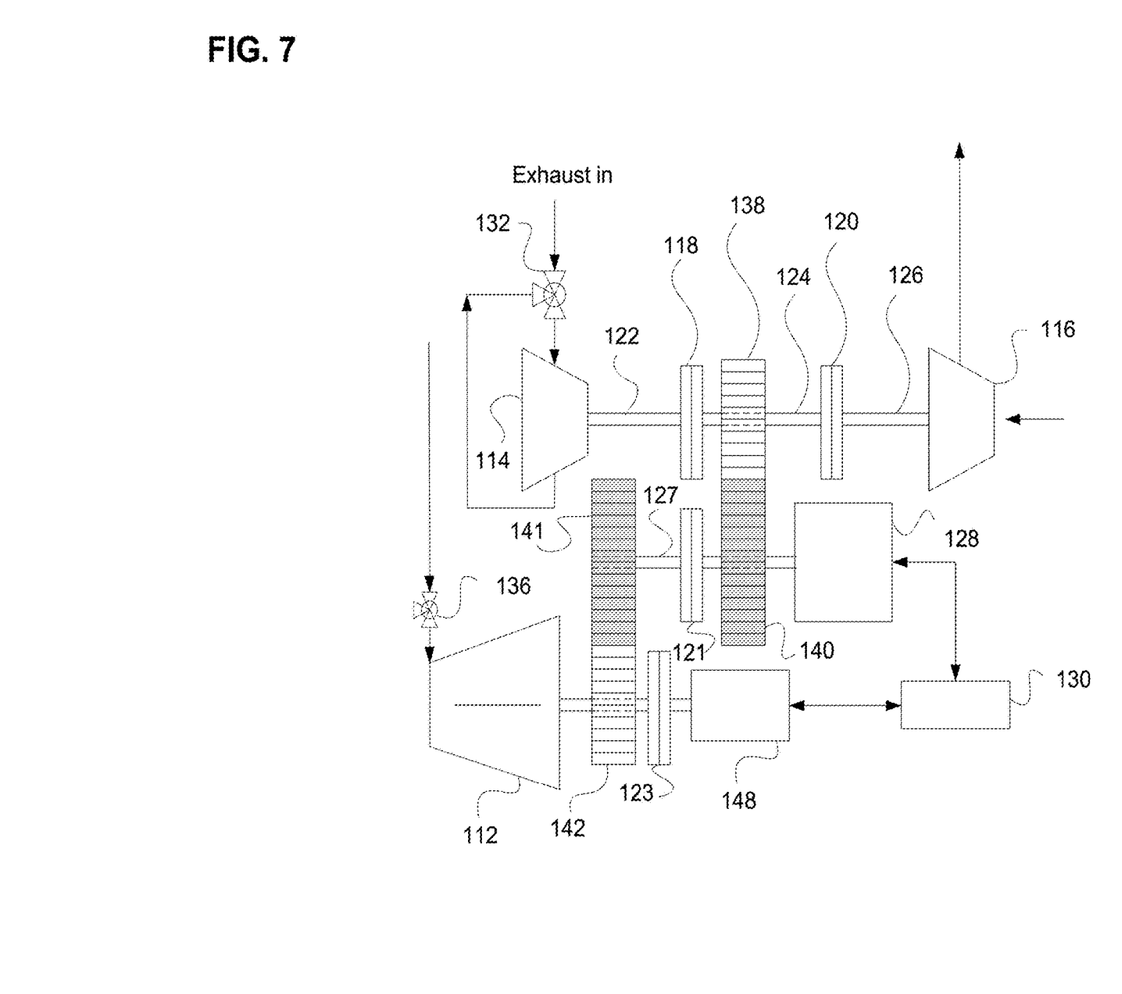
FIG. 7 is a diagram of a portion of the motor assisted turbocharger system, including a generator, according to one example.

FIG. 7 is a diagram of a portion of the motor assisted turbocharger system 100a, including a generator 148, according to one example. The portion of the motor assisted turbocharger system 100a is identical to that shown in FIG. 2 through FIG. 5 with the addition of the generator 148 and a fourth power transmission device 123. Any of the arrangements of FIG. 2 through FIG. 5 may also include the generator 148 and the fourth power transmission device 123 as described by FIG. 7.

The fourth power transmission device 123 is connected on a first side to the output gear 142, and the fourth power transmission device 123 is connected on a second side to the generator 148. The fourth power transmission device 123 may then be engaged for the expander 112 to drive the generator 148 through the output gear 142 and the fourth power transmission device 123. The fourth power transmission device 123 may be disengaged for the expander 112 to only drive the output gear 142 and transfer power to the motor gear 140 and the drive gear 138, provided the third power transmission device 121 is also engaged.

In another example, the fourth power transmission device 123 is omitted and the generator 148 is directly connected to the output gear 142. In a case where the expander 112 provides power to the output gear 142, power is distributed to both the generator 148 and the motor gear 140, provided the third power transmission device 121 is also engaged.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernable variants of the teachings herein, define, in part, the scope of the foregoing claim terminology such that no inventive subject matter is dedicated to the public.

What is claimed is:

1. A system for recovering waste heat energy for a motor assisted turbocharger, comprising:
 a turbine;
 a drive gear, a motor gear drivingly connected to the drive gear, and an output gear drivingly connected to the motor gear;
 a first power transmission device connected on a first side to the turbine, and the drive gear disposed about and connected to a second side of the first power transmission device;
 a second power transmission device connected on a first side to a side of the drive gear opposite the first power transmission device;
 a compressor connected to a second side of the second power transmission device;
 a motor generator connected to the motor gear;
 a waste heat recovery circuit including an expander, the output gear connected to the expander;
 wherein, in a case where the first power transmission device is engaged, engine exhaust gas drives the turbine, and the turbine drives at least one of the compressor and the motor generator.

2. The system according to claim 1, further comprising:
 a boiler, disposed in the waste heat recovery circuit upstream of the expander; and
 a boiler bypass valve, disposed upstream of the boiler, downstream of the turbine, and outside of the waste heat recovery circuit;
 a turbine bypass valve, disposed upstream of an inlet of the turbine; and
 an expander bypass valve, disposed upstream of an inlet of the expander and downstream of the boiler;
 wherein, the turbine bypass valve is open, exhaust gas is directed around the turbine, the boiler bypass valve is closed, and exhaust gas is directed to the boiler, further heating fluid in the waste heat recovery circuit upstream of the expander.

3. The system according to claim 1, further comprising:
 a boiler, disposed in the waste heat recovery circuit upstream of the expander; and
 a boiler bypass valve, disposed upstream of the boiler, downstream of the turbine, and outside of the waste heat recovery circuit;
 a turbine bypass valve, disposed upstream of an inlet of the turbine; and
 an expander bypass valve, disposed upstream of an inlet of the expander and downstream of the boiler;
 wherein, the turbine bypass valve is open, exhaust gas is directed around the turbine, the boiler bypass valve is open, and exhaust gas is directed around the boiler.

4. The system according to claim 1, further comprising:
 an energy storage device;
 wherein, the second power transmission device is disengaged, the turbine drives the motor generator, and the motor generator operates as a generator to charge an energy storage device.

5. The system according to claim 1, wherein:
 the second power transmission device is engaged and the turbine drives the compressor.

6. The system according to claim 5, wherein:
 the motor generator operates as a motor and also drives the compressor.

7. The system according to claim 1, wherein:
 in a case where the expander bypass valve is closed, waste heat drives the expander, and the expander drives at least one of the compressor and the motor generator.

8. The system according to claim 7, wherein:
 in a case the first power transmission device is disengaged, the second power transmission device is engaged, and the motor generator operates as a motor and drives the compressor.

9. The system according to claim 7, wherein:
 the second power transmission device is disengaged, and the motor generator operates as a generator to charge an energy storage device.

10. The system according to claim 1, wherein:
 the waste heat recovery circuit further comprises a pump, a heat exchanger, a coolant conduit, and at least one heat source.

11. The system according to claim 10, wherein:
 the at least one heat source is selected from the group consisting of a cold plate, an intercooler, a boiler, an engine block, and a recuperator.

12. The system according to claim 4, wherein:
 the energy storage device further comprises at least one of a vehicle traction battery and a supplemental battery.

13. A method for assisting a turbocharger system using waste heat energy, the method comprising the steps of:
 heating a fluid with at least one of a power electronics cold plate, engine coolant, an engine, a boiler, and a recuperator;
 cooling the fluid using a condenser;
 operating a first power transmission device and a second power transmission device, wherein the first power transmission device connected on a first side to a turbine, and a drive gear disposed about and connected to a second side of the first power transmission device, the second power transmission device connected on a first side to a side of the drive gear opposite the first power transmission device; a compressor connected to a second side of the second power transmission device;
 engaging the first power transmission device;
 driving the turbine using engine exhaust gas such that the turbine drives at least one of the compressor and a motor generator.

14. A method for assisting a turbocharger system using waste heat energy, the method comprising the steps of:
 heating a fluid with at least one of a power electronics cold plate, engine coolant, an engine, a boiler, and a recuperator;
 cooling the fluid using a condenser;
 operating a first power transmission device and a second power transmission device, wherein the first power transmission device connected on a first side to a turbine, and a drive gear disposed about and connected to a second side of the first power transmission device, the second power transmission device connected on a first side to a side of the drive gear opposite the first power transmission device; a compressor connected to a second side of the second power transmission device;
 driving an expander such that the expander drives at least one of the compressor and a motor generator.

15. The method of claim 14, further comprising the steps of:
 engaging the second power transmission device; and
 driving the compressor with the motor generator and the expander.

16. The method of claim 14, further comprising the steps of:
 engaging the second power transmission device; and
 driving the compressor and the motor generator with the expander.

17. The method of claim 14, further comprising the steps of:
- disengaging the second power transmission device;
- driving the motor generator with the expander; and
- charging the energy storage device with the generator.

18. The method of claim 14, wherein the heating the fluid step comprises changing the fluid from a liquid phase to a gas phase before entering the expander, and then changing the fluid to a liquid phase.

19. The method of claim 14, further comprising the step of:
- directing heat energy to bypass at least one of the turbine, the boiler, and an expander.

20. The method of claim 14, further comprising the step of:
- directing heat energy from an exit of the expander through the recuperator; and
- reducing heat transfer in the condenser,
- wherein the fluid is an organic fluid.

\* \* \* \* \*